United States Patent
Morris et al.

(10) Patent No.: US 9,667,489 B2
(45) Date of Patent: May 30, 2017

(54) GENERATION AND MANAGEMENT OF COMPUTING INFRASTRUCTURE INSTANCES

(71) Applicant: New Media Solutions, Inc., Denver, CO (US)

(72) Inventors: Steven Morris, Denver, CO (US); Kevin Bridges, Thornton, CO (US); Rick Manelius, Longmont, CO (US)

(73) Assignee: New Media Solutions, Inc., Denver, CO (US)

( * ) Notice: Subject to any disclaimer, the term of this patent is extended or adjusted under 35 U.S.C. 154(b) by 174 days.

(21) Appl. No.: 14/724,405

(22) Filed: May 28, 2015

(65) Prior Publication Data

US 2015/0350021 A1    Dec. 3, 2015

Related U.S. Application Data

(60) Provisional application No. 62/004,044, filed on May 28, 2014.

(51) Int. Cl.
*G06F 15/173* (2006.01)
*H04L 12/24* (2006.01)
(Continued)

(52) U.S. Cl.
CPC .......... *H04L 41/0816* (2013.01); *G06F 9/50* (2013.01); *H04L 43/08* (2013.01); *H04L 67/10* (2013.01)

(58) Field of Classification Search
USPC ............. 709/224, 217, 226, 225, 220, 223
See application file for complete search history.

(56) References Cited

U.S. PATENT DOCUMENTS 7,546,308 B1 *   6/2009  Hu ................... H04L 67/322
2005/0283531 A1 * 12/2005  Chen ................ H04L 67/142
                                                      709/225

(Continued)

OTHER PUBLICATIONS

International Patent Application No. PCT/US2015/033017, "Notification of the International Preliminary Report on Patentability", mailed Aug. 5, 2016, 21 pages.

(Continued)

*Primary Examiner* — Jude Jeans Gilles
(74) *Attorney, Agent, or Firm* — Kilpatrick Townsend & Stockton, LLP

(57) ABSTRACT

Various techniques are described herein for generating and managing computing infrastructure instances within datacenters. Data identifying various computing infrastructure characteristics may be receive and analyzed in order to determine one or more computing infrastructure definitions to be instantiated within a datacenter. Specific datacenters may be determined for instantiating the computing infrastructure definitions, various provisioning and configuration management tools may be selected, and computing infrastructure instances comprising multiple interoperable services (e.g., web services) and other components may be provisioned, configured, tested, and maintained. In some examples, instance execution data may be received and analyzed via instance monitor components transmitted and deployed within computer infrastructure instances executing on datacenters. Instance monitor components may collect instance execution data, which may be analyzed to identify issues of performance, stability, cost, and the like, associated with various combinations of computing infrastructure definitions, datacenters, services, and configurations.

19 Claims, 9 Drawing Sheets

(51) Int. Cl.
H04L 12/26 (2006.01)
H04L 29/08 (2006.01)
G06F 9/50 (2006.01)

(56) References Cited

U.S. PATENT DOCUMENTS

2009/0183021 A1* 7/2009 Arnold ................ G06F 11/3608
714/2
2011/0145830 A1 6/2011 Yamaguchi et al.
2012/0124211 A1 5/2012 Kampas et al.
2012/0297016 A1* 11/2012 Iyer ...................... G06F 9/5072
709/217
2012/0311111 A1* 12/2012 Frew .................... G06F 9/5072
709/221
2013/0124807 A1* 5/2013 Nielsen ............... G06F 11/1438
711/162
2013/0188512 A1* 7/2013 Norris ................. H04L 12/4641
370/254
2014/0089511 A1* 3/2014 McLean ............... G06F 9/5061
709/226

OTHER PUBLICATIONS

International Patent Application No. PCT/US2015/033017, "Written Opinion", mailed on Apr. 25, 2016, 5 pages.
International Search Report and Written Opinion for International Application No. PCT/US2015/033017 mailed on Oct. 15, 2015, 9 pages.

* cited by examiner

INPUT COMPUTING INFRASTRUCTURE CHARACTERISTICS

500

Infrastructure Type/Usage: Internet Site/Services

Site Type:

Anticipated Site Traffic:

Traffic Patterns/Spikes: [📅] [12:00] [AM/PM]

Data Storage Required:

Throughput Required:

Email Enabled: [Yes/No]

Storage Features:

Security Features:

Cost: ——◆——  Availability: ——◆——

Performance: ——◆——  Scalability: ——◆——

GENERATION AND MANAGEMENT OF COMPUTING INFRASTRUCTURE INSTANCES

RELATED APPLICATIONS

The present application is a non-provisional of and claims priority to U.S. Provisional Patent Application No. 62/004,044, filed May 28, 2014, entitled "METHODS AND SYSTEMS FOR COMPREHENSIVE INFRASTRUCTURE MANAGEMENT." The entire contents of provisional application No. 62/004,044 is incorporated herein by reference for all purposes.

BACKGROUND

Computer and network systems architecture, web development, computerized infrastructure, and related testing and development have become increasingly complicated fields with developers and information technology (IT) professionals having access to a litany of different services, provisioners, and hardware configurations through which an entity's computing infrastructure may be created, modified, and managed. Typically, one or more computing infrastructure instances may be used to create, configure, and manage an entity's web services and other computing resources, in order to limit the amount of resources and IT staffing necessary to effectively deploy and manage the entity's computing resources. When such an arrangement may not be ideal and could result in a loss of short and/or long term flexibility, a single cloud service provider may be used for hosting the entirety of an entity's web presence and other computing resources, in order to maintain simplicity and simplify the training of the entity's IT staff.

BRIEF SUMMARY

Aspects described herein provide various techniques for generating and managing computing infrastructure instances within datacenters. In some embodiments, data identifying various computing infrastructure characteristics may be receive and analyzed in order to determine one or more computing infrastructure definitions to be instantiated within a datacenter. Additionally, one or more specific datacenters (e.g., cloud computing platforms, on-premise server farms, etc.) may be determined for instantiating the computing infrastructure definitions. After determining the computing infrastructure definitions to be instantiated and/or the datacenters on which to instantiate them, various provisioning and configuration management tools may be selected, and a computing infrastructure instance comprising multiple interoperable services (e.g., web services) and other components may be provisioned, configured, tested, and maintained by the provisioning and configuration management tools. In various embodiments, computing infrastructure definitions may be either datacenter-specific or datacenter-agnostic, provisioner-specific or provisioner-agnostic, and may include files or other data records with service and component definitions, and specific instructions for provisioning, configuring, and maintaining services within computing infrastructures.

Additionally aspects described herein provide various techniques for receiving and analyzing instance execution data via an instance monitor component. In some embodiments, an instance monitor component may be transmitted to a datacenter, deployed and executed within a computer infrastructure instance on the datacenter. Instance monitor components may be configured to collect various log data and other output (e.g., errors and exceptions, function calls, performance data, etc.) associated with various services of computing infrastructure instances. The instance monitor components then may analyze and/or transmit the instance execution data back to a user system, an orchestration system and/or other intermediary system. Such systems may receive and store multiple instance execution data transmitted by different components within different computing infrastructure instances at different times. The resulting repositories of instance execution data may be analyzed to identify issues of performance, stability, cost, and the like, associated with various combinations of computing infrastructure definitions, datacenters, services, and configurations.

BRIEF DESCRIPTION OF THE DRAWINGS

FIG. 5 is an example screen of a user interface for inputting a set of characteristics for a computing infrastructure instance, in accordance with one or more embodiments of the present invention.

Figure 1:
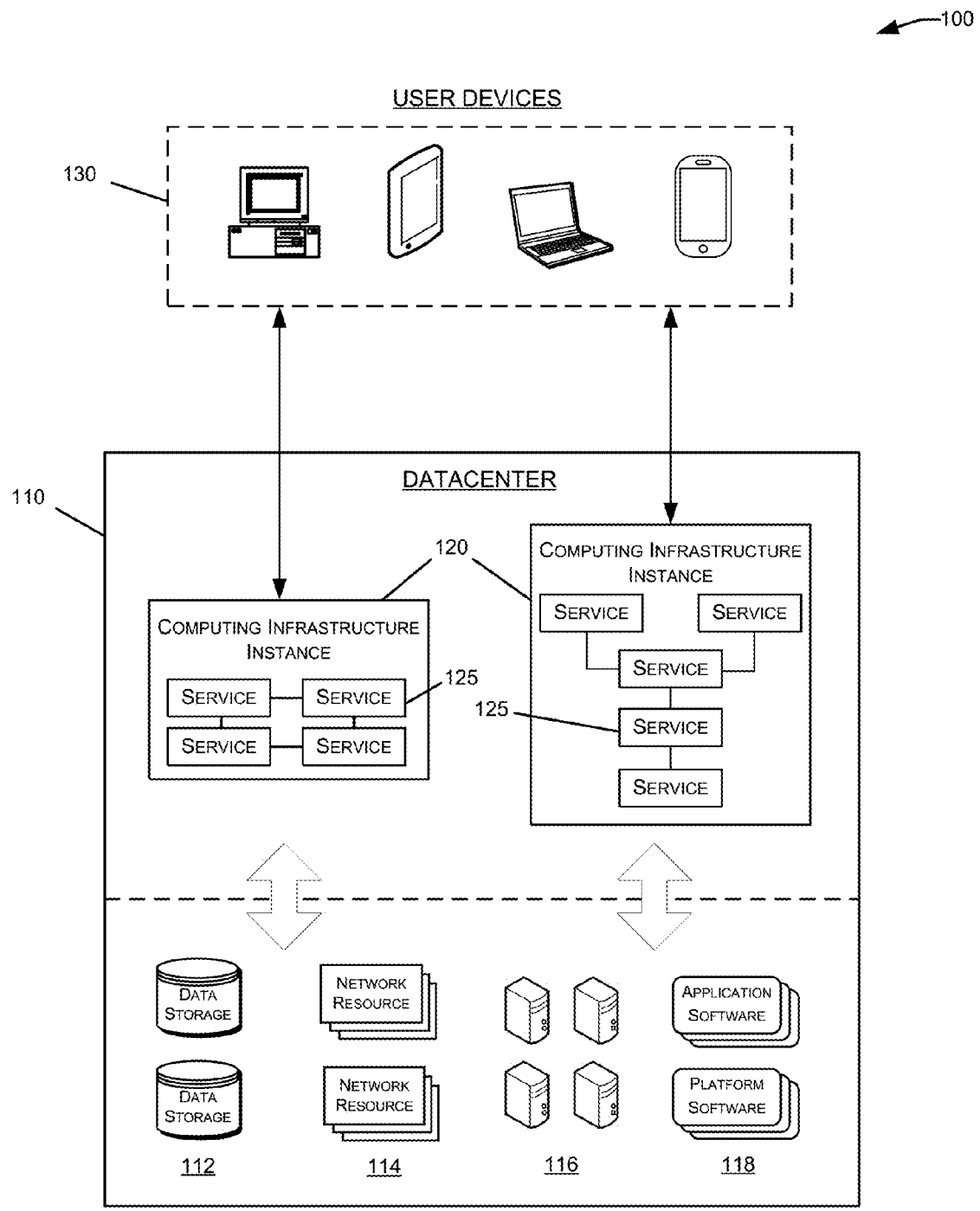
FIG. 1 is a block diagram illustrating, at a high-level, components of a system including a datacenter for deploying and executing computing infrastructure instances, according to one or more embodiments described herein.

In the appended figures, similar components and/or features may have the same reference label. Further, various compo of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited non-transitory media such as portable or fixed storage devices, optical storage devices, and various other mediums capable of storing, containing or carrying instruction(s) and/or data. A code segment or computer-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium. A processor(s) may perform the necessary tasks.

Various techniques (e.g., methods, systems, non-transitory computer-readable storage memory storing a plurality of instructions executable by one or more processors, etc.) are described herein for generating and managing computing infrastructure instances within datacenters. As used herein, a datacenter may refer to a set of computer servers and/or additional computing resources, such as storage devices, network resources, software images, etc., on which Internet-based services and other computing functionality may instantiated. In some embodiments, datacenters may comprise cloud computing platforms maintained by cloud service providers. Additionally or alternatively, datacenters may comprise on-premise server farms and other computing resource infrastructures. Regardless of whether cloud computing platforms or non-based datacenter systems (e.g., on-premise datacenters, etc.) are used, the datacenter may include plugins generated for specific APIs, (e.g., APIs 326, discussed below).

With reference now to FIG. 1, a block diagram is shown illustrating components of a system 100 including computing infrastructure instances 120 executing on a datacenter 110. The computing infrastructure instances 120 shown in this example may correspond to a high-level computer architecture created and maintained by an enterprise or organization that provides Internet-based services 125 and/or other computing resources and functionality to various users 130. Specific examples of computing infrastructure instances 120 may include, without limitation, eCommerce systems, enterprise resource planning (ERP) systems, document management systems, customer relationship management (CRM) systems, and the like. Thus, computing infrastructure instances 120 may be built and maintained by enterprises or other organizations, such as an educational institutions or governmental entities, to provide Internet-based services 125 to users 130 such as customers, employees, students, or other organization members. The system 100 shown in FIG. 1 may be implemented a cloud-based multi-tier system in this example, in which upper-tier user devices 130 request and receive access to the Internet-based services 125 within the computing infrastructure instances 120, and wherein the computing infrastructure instances 120 are deployed and executed upon an underlying set of hardware and/or software resources 112-118. Additionally, although cloud-based systems 100 may be used in some embodiments, systems 100 in other examples may use on-premise datacenters, server farms, distributing computing systems, and other various non-cloud computing architectures.

Various Internet-based services 125 may be implemented in hardware, software, or a combination of hardware and software. As discussed in more detail below, services 125 may be generated, deployed, and executed within datacenters 110, using the underlying system hardware or software components such as data storage devices 112, network resources 114, computing resources 116 (e.g., servers), and various software components 118. In some embodiments, the services 125 within a computing infrastructure instance 120 correspond to different software components executing on the same underlying computer server(s) 116, networks 114, data stores 112, and/or within the same virtual machines. Some computing infrastructure instances 120 and/or services 125 within those instances 120 may use dedicated hardware and/or software resources, while other 120 and/or services 125 may share underlying resources 112-118. In either case, certain higher-level services 125 (e.g., user applications), as well as users at user devices 130, need not ever be aware of the underlying resources being used to support the services.

As discussed below in more detail, the datacenter 110 may include various hardware and/or software components (e.g., application programming interfaces (APIs), cloud resource managers, etc.) to allocate, run, and monitor computing infrastructure instances 120, as well as to manage the underlying resources 112-118. For example, user devices 130 and other systems, such as the computing infrastructure orchestration systems described below, may instruct a resource manager component within the datacenter 110 to allocate the necessary data storage resources 112, network resources 114, processing resources 116, and software resources 118, for generating, configuring, deploying, and testing computing infrastructure instances 120 containing one or more services 125. The underlying resources of the datacenter 110 may include, for example, a set of non-volatile computer memory devices 112 implemented as databases, file-based storage, etc., a set of network hardware and software components 114 (e.g., routers, firewalls, gateways, load balancers, etc.), a set of host servers 116, and various software resources 118. Software resources 118 may include, for example, store software images, installations, builds, templates, configuration files, and the like, corresponding to different versions of various platform, server, middleware, and application software.

The datacenter 110 may also include additional resources such as hypervisors, host operating systems, resource managers and other cloud-based applications, along with the hardware and software infrastructure to support various Internet-based services, such as Infrastructure as a Service (IaaS), Platform as a Service (PaaS), and Software as a Service (SaaS). Additionally, the underlying hardware 112-116 of the datacenter 110 may be configured to support a number of internal shared services used in generating, provisioning, configuring, deploying, executing, and testing computing infrastructure instances 120. Such internal shared services may include, for example, security and identity services, integration services, repository services, enterprise management services, virus scanning services, backup and recovery services, notification services, file transfer services, and the like.

As noted above, many different types of computer architectures (cloud-based, web-based, multi-tier computing environments, distributed computing environments, etc.) may be used to generate and manage computing infrastructure instances 120 in accordance with various embodiments of the invention. However, in certain implementations, cloud computing platforms 110 may be used to provide certain advantageous features for generation and management of instances 120. For example, cloud computing platforms 110 may provide elasticity and scalability to quickly provision, configure, and deploy many different types of computing infrastructure instances 120, in contrast to non-cloud based implementations having fixed architectures and limited hardware resources. Moreover, public cloud, private cloud, and public-private hybrid cloud platforms 110 may be used in various embodiments to leverage the features and advantages of each distinct architecture.

Figure 2:
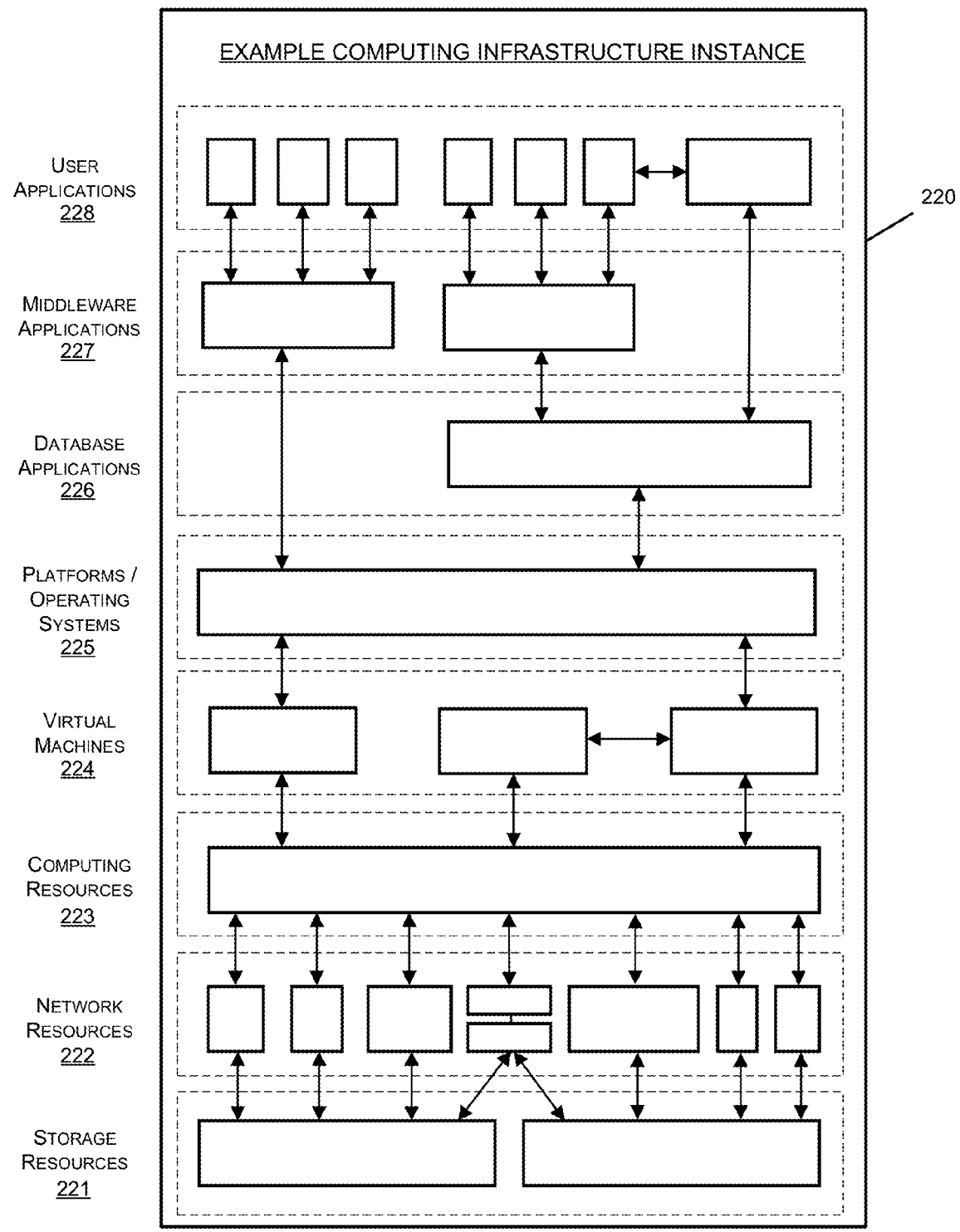
FIG. 2 is a block diagram illustrating an example of computing infrastructure instance comprising multiple hardware and/or software services, in accordance with one or more embodiments of the present invention.

Referring now to FIG. 2, an illustrative example is shown of a computing infrastructure instance 220 which may be deployed and executed within one or more datacenters. As used herein, computing infrastructure instances may include one or more instantiated and running programs which may provide services to other internal components and/or to authorized external devices. These programs, or services, may expose interfaces, and receive and respond to requests for specific functionality supported by the service. Each service may support a predetermined set of operations or methods.

In this example, a single computing infrastructure instance 220 is shown including a number of different interoperable services, represented by the different boxes within the instance 220. It should be understood that the example instance 220 is illustrative only. In this example, multiple different services may interact at different functional layers to form a "stack" infrastructure. Various services in the stack may provide hardware and/or software resources, which may be used in combination to implement an end-to-end comprehensive computing system via the computing infrastructure instance 220. Each component (or service) within the computing infrastructure instance 220 may correspond to the resources of one or more hardware devices (e.g., servers, storage, and network devices) and/or one or more software applications (e.g., operating systems, firmware, device drivers, middleware, and user applications).

The computing infrastructure instance 220 in this example is configured as a stack infrastructure, in which eight different service layers are shown containing various services. However, it should be understood that the stack infrastructure is illustrative only, and that computing infrastructure instance 220 and their constituent services need not be restricted to the service layers and interactions used in this example. In some embodiments, the computing infrastructure instance 220 may correspond to an integrated infrastructure which has been designed, configured, and tested as an integrated computing system prior to deployment. For example, instance 220 may be designed and implemented as a combination of selected services, including computer servers, storage devices, and network devices, along with virtual machine servers, operating systems, database, middleware, and user application software. Such instances 220 may be implemented in accordance specific computing system requirements, and may be offered as a single Internet-based service solution or product. In other embodiments, the computing infrastructure instance 220 might not be designed as an integrated infrastructure, but may include various interactive services that expose and provide hardware and/or software systems having different manufacturers and compatibilities. For instance, the services within some computing infrastructure instances 220 may include legacy hardware services, software services, storage services, and network services, combined with corresponding newly-implemented services. The services in such instances 220 may be provisioned, deployed, and configured individually at different times, and such services may operate in different data centers and/or different geographic locations.

In this example, the computing infrastructure instance 220 may be configured as an integrated stack including various hardware and/or software services within functional categories (or layers) 221-228. Storage resources 221 may include services that, for example, provide storage via disk arrays (e.g., network-attached storage arrays, storage area networks, etc.) and/or other storage systems. Network resources 222 may include services that provide physical network capabilities and/or functional features of network appliances (e.g., routers, firewalls, gateways, load balancers, etc.). Computing resources 223 may include services that, for example, provide reduced instruction set computing (RISC) processor-based and/or x86 processor-based server systems. In some examples, multiple services (e.g., computer servers) within resource layer 223 may include common processors, as well as other hardware components for memory interconnect, I/O, and the like. Virtual machines 224 may include services providing various server software applications to support virtualization capabilities on the underlying computer servers within computing resources 223, along with the creation and management of large numbers of virtual machines. Different virtual machine services 224 may correspond to different virtualization options, such as flexible and secure live migration between hosts, dynamic resource management of CPU, memory, virtual I/O, and crypto accelerators on running virtual machines, redundant virtual networks and disks, etc. Platforms/operating systems services 225 may include services providing operating systems of various types and features configured to support servers, workstations, and/or mobile devices. The features of platform/operating system services 225 in various embodiments may include integrated cloud support, virtualization, and software-defined networking capabilities, as well as optimization for database, middleware, and application deployments. Database application services 226 may include one or more database management software systems configured to store and analyze data through various interactions with users, software applications, and underlying data stores. Middleware applications 227 may include services which provide middleware computer servers and software tools to support deployment and delivery of user applications. Examples of services in middleware applications 227 may include, for example, web servers, content management servers, and/or application servers. User applications 228 may include services which provide various application servers and software applications to support interaction with end user devices as well as other applications and systems. Services within the user applications layer 228 may include, for example and without limitation, supply chain management (SCM) software systems, human resource management software systems, customer relationship management (CRM) software systems, financial management software systems, and enterprise performance management (EPM) software systems, as well as various other software systems designed for users within companies, educational or governmental entities, and other organizations.

Figure 3:
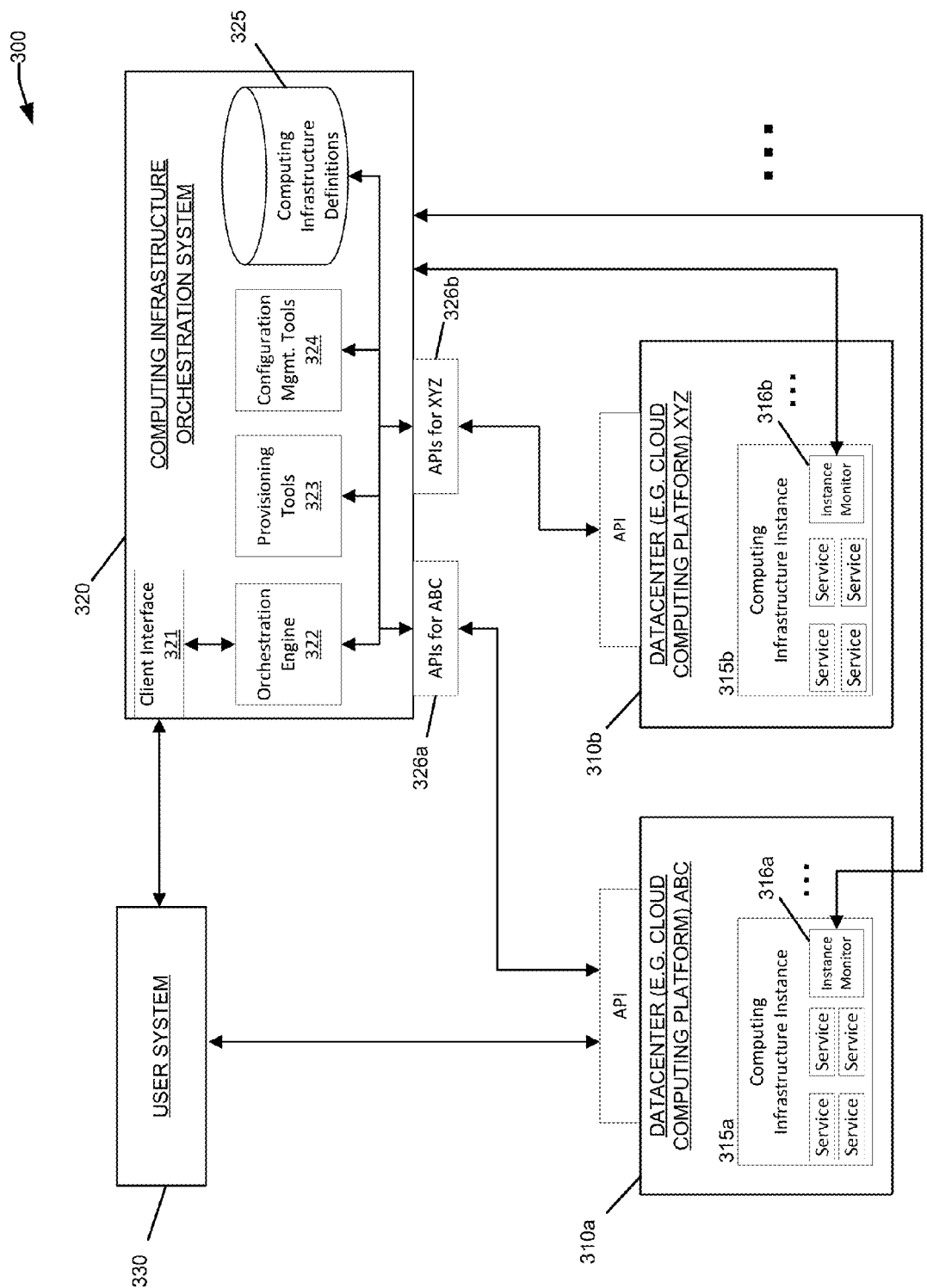
FIG. 3 is a block diagram illustrating a system for generating and managing computing infrastructure instances within datacenters, in accordance with one or more embodiments of the present invention.

Referring now to FIG. 3, an illustrative embodiment is shown of a system 300 for generating and managing computing infrastructure instances within one or more datacenters. In this example, the datacenters may correspond to cloud computing platforms; however, as discussed above, non-cloud datacenters (e.g., on-premise server farms, etc.) may similarly be used in other examples. In this example, system 300 includes at least two datacenters 310 (e.g., cloud computing platforms 310a, 310b, . . . ), a computing infrastructure orchestration system 320, and a user device 330. System 300 illustrated in this example, and other such systems described herein, may represent a high-level computer architecture for a system used to determine computing infrastructure definitions to be instantiated to perform Internet-based services, determine one or more datacenters (e.g., cloud computing platforms) on which such computing infrastructure definitions should be instantiated, and then to generate (e.g., provision), configure, deploy, and manage various computing infrastructure instances within the datacenters. The various components shown in example system 300, including user device 330, orchestration system 320, and cloud computing platforms 310 each may be implemented within an individual computer system or combination of systems including specialized combinations of hardware, software, and network components as described herein.

System 300 may include two or more datacenters (e.g., cloud computing platforms 310a, 310b, . . . ), each configured to store and execute one or more computing infrastructure instances (315a, 315b, . . . ). Each computing infrastructure instance 315 may include components configured to provide Internet-based services. The cloud computing platforms 310, instances 315, and the services within the instances 315 shown in this example may be similar to the datacenters, computing infrastructure instances, and Internet-based services discussed above in FIGS. 1 and 2. As noted above, any number of different types of cloud computing platforms 310 and other datacenters may be used in various embodiments. For example, cloud computing platforms 310 may correspond to a different cloud services provider offering SaaS (software as a service), infrastructure as a service (IaaS), and/or PaaS (platform as a service). Examples of the different cloud computing platforms 310 that may be used in different embodiments include, without limitation, AMAZON WEB SERVICES, RACKSPACE, SALESFORCE.COM, MICROSOFT OFFICE 365, MICROSOFT WINDOWS AZURE, IBM SOFTLAYER, ORACLE CLOUD, GOOGLE APPS, SAVVIS, TERREMARK, and the like.

In this example, computing infrastructure instances 315a and 315b also each include a respective instance monitor component 316a and 316b. As discussed below in more detail, instance monitors 316 may be executable software components transmitted to and/or instantiated on the cloud computing platforms 310 to monitor the activities and performance of computing infrastructure instances 315. For example, instance monitor components 316 may include executable software transmitted from orchestration systems 320 and/or user devices 330, and configured to execute within specific cloud computing platforms 310 and/or instances 315. In some cases, instance monitor components 316 may be executable daemons configured to run as background processes within their respective instances 315, to monitor the execution of the various services within the instance 315, and then analyze and/or transmit data collected regarding the execution of the instance 315 back to an orchestration system 320 and/or user device 330 that transmitted the instance monitor component 316.

System 300 also may include one or more user devices 330. As discussed below, user devices may interact with orchestration systems 320 via one or more client interface components 321 to generate and manage various computing infrastructure instances 315 within various cloud computing platforms 310 and/or other datacenters. In various different embodiments, the interface 321 may be a graphical user interface (GUI) or a command-line interface. Additionally, certain user devices 330 may interact directly with the cloud computing platforms 310 (e.g., via application programming interfaces), rather than through an orchestration system 320, to generate, manage, and/or receive monitoring data relating to computing infrastructure instances 315. However, it may be advantageous in some examples to provide interface 321 rather than relying on direct communication (e.g. 330 to 310a), so that the user device 330 may benefit from the additional logic embedded within the orchestration system 320.

User devices 330 may include mobile devices such as smartphones, tablet computers, personal digital assistants, and wearable computing devices. Mobile user devices 330 may run a variety of mobile operating systems, and may be enabled for Internet, e-mail, short message service (SMS), Bluetooth®, mobile radio-frequency identification (M-RFID), and/or other communication protocols. Other user devices 330 may be general purpose personal computers or special-purpose computing devices including, by way of example, personal computers, laptop computers, workstation computers, and the like. Additionally, user devices 330 may be any other electronic devices, such as a thin-client computers, business or home appliances, and/or personal messaging devices, capable of communicating with the orchestration systems 320 and cloud computing platforms 310 via various communications network(s) and protocols. User devices 330 may contain components that support communications with other devices, such as wireless transceivers and wireless communications interfaces, Ethernet sockets or other Local Area Network (LAN) interfaces, etc. In some implementations, user devices 330 may use security features and/or specialized hardware (e.g., hardware-accelerated SSL and HTTPS, WS-Security, firewalls, etc.) to communicate with orchestration systems 320 and/or cloud computing platforms 310.

System 300 also includes a computing infrastructure orchestration system 320. As discussed below, orchestration systems 320 may interact with one or more user devices 330 and/or cloud computing platforms 310 to generate and manage computing infrastructure instances 315 within the cloud computing platforms 310. In this example, the computing infrastructure orchestration system 320 includes a client interface component 321 for communicating with client devices 330, an orchestration engine 322, provisioning tools 323, configuration management tools 324, and computing infrastructure definition data store 325, and one or more APIs 326 to facilitate communication with cloud computing platforms 310.

Within the orchestration system 320, client interface 321 may include one or more of a command-line interface, a graphical user interface, or another software interface (e.g., an API exposed by the orchestration system 320) configured to receive commands and provide output to user devices 330. As noted above, in some cases, user system 330 may bypass the orchestration system 320 altogether and interact directly with the underlying datacenters 310 (see arrow 330 to 310a). Additionally, the client interface 321 may be distinct and implemented wholly separately from the components of the orchestration system 320 and from the APIs 326. In some cases, multiple different client interfaces 321 may be provided. For example, a basic interface 321 (e.g., a command-line interface) may provide user systems 330 with access to a more limited set of functionality for invoking the APIs 326, whereas a more sophisticated interface 321 (e.g., a GUI) may provide user systems 330 with access to more advanced features described herein (e.g., analytics, recommendations, etc.) using the same APIs 326.

Additionally, in certain embodiments, the orchestration system 320 may receive computing infrastructure characteristics, or other data describing a computing infrastructure instance, from user devices 330 via client interface 321. In other examples, such characteristics or other data describing existing or potential instances 315 may be received directly from cloud computing platforms 310, via APIs 326 or other interfaces.

Orchestration engine 322 may include one or more software modules containing algorithms and/or logic for controlling the operation of the orchestration system 320, including the devices drivers and other components to instantiate and control the other subcomponents within the orchestration system 320, such as the provisioning tools 323, configuration tools 324, and data store 325. As such, orchestration engine 322 may be executed by a server or other form of computer system. In certain examples, the orchestration engine 322 may other components (e.g., client interface 321, provisioning tools 323, configuration tools 324, data stores 325 and/or API's 326) as integrated subcomponents within the orchestration engine 322. In other examples, these components may be implemented as separate software components and/or on separate hardware systems.

In certain embodiments, the orchestration engine 322 may receive and analyze computing infrastructure characteristics from user devices 330, and then may select one or more corresponding computing infrastructure definitions from the data store 325. The orchestration engine 322 also may select one or more cloud computing platforms 310 on which to instantiate the selected definitions, and then may direct the generation and management of the instances 315 using the provisioning tools 323 and configuration management tools 324. In some embodiments, orchestration engine 322 may be API-based command engine having built-in API's 326. Additionally, as discussed below, the orchestration engine 322 may design, implement, and deploy instance monitor components 316 within cloud computing platforms 310, and may then receive and analyze instance monitoring data transmitted back by the instance monitor components 316.

Provisioning tools 323 and/or configuration management tools 324 may include multiple individual provisioning software tools, individual configuration software tools, and/or combined provisioning and configuration software tools. Examples of such tools 323 and 324 may include, without limitation, ENTERPRISE CHEF, PUPPET ENTERPRISE, ANSIBLEWORKS ANSIBLE, and SALTSTACK ENTERPRISE, among others. Provisioning and/or configuration management tools 323-324 may be used to instantiate, provision, configure, and manage the various Internet-based services making up the computing infrastructure instances 315.

Computing infrastructure definition data store 325 may include secure storage devices configured to receive and store definitions of the various Internet-based services (or web services) within computing infrastructure instances 315, and the interactions between different web services within the instances 315. Such definitions may include the definition of services (e.g., including specific builds, versions, installation settings, and configuration settings) along with the interconnections of multiple services within an instance 315. Data store 525 may be implemented as a database or file-based storage system. In either case, definitions of computing infrastructures may be stored as a single record/file or as multiple interrelated records/files.

In some cases, a single provisioning tool 323 and/or configuration management tool 324 may be compatible only with some datacenters (e.g., cloud computing platforms 310) and not others. In other cases, some provisioning tools 323 and/or configuration management tools 324 may be compatible with all datacenters 310 within the system 300. Similarly, in some embodiments, infrastructure definitions within the data store 325 might only be compatible with certain specific provisioning and configuration tools 324, or certain specific datacenters 310. In other embodiments, the computing infrastructure definitions within data store 325 may be provisioner-agnostic datacenter-agnostic, and/or cloud provider-agnostic, so that each computing infrastructure definition in the data may be generated using any of the provisioning and configuration tools 324 in the system 300, and/or may be instantiated on any of the cloud computing platforms 310 (and other datacenters 310) accessible to the system 300.

Figure 4:
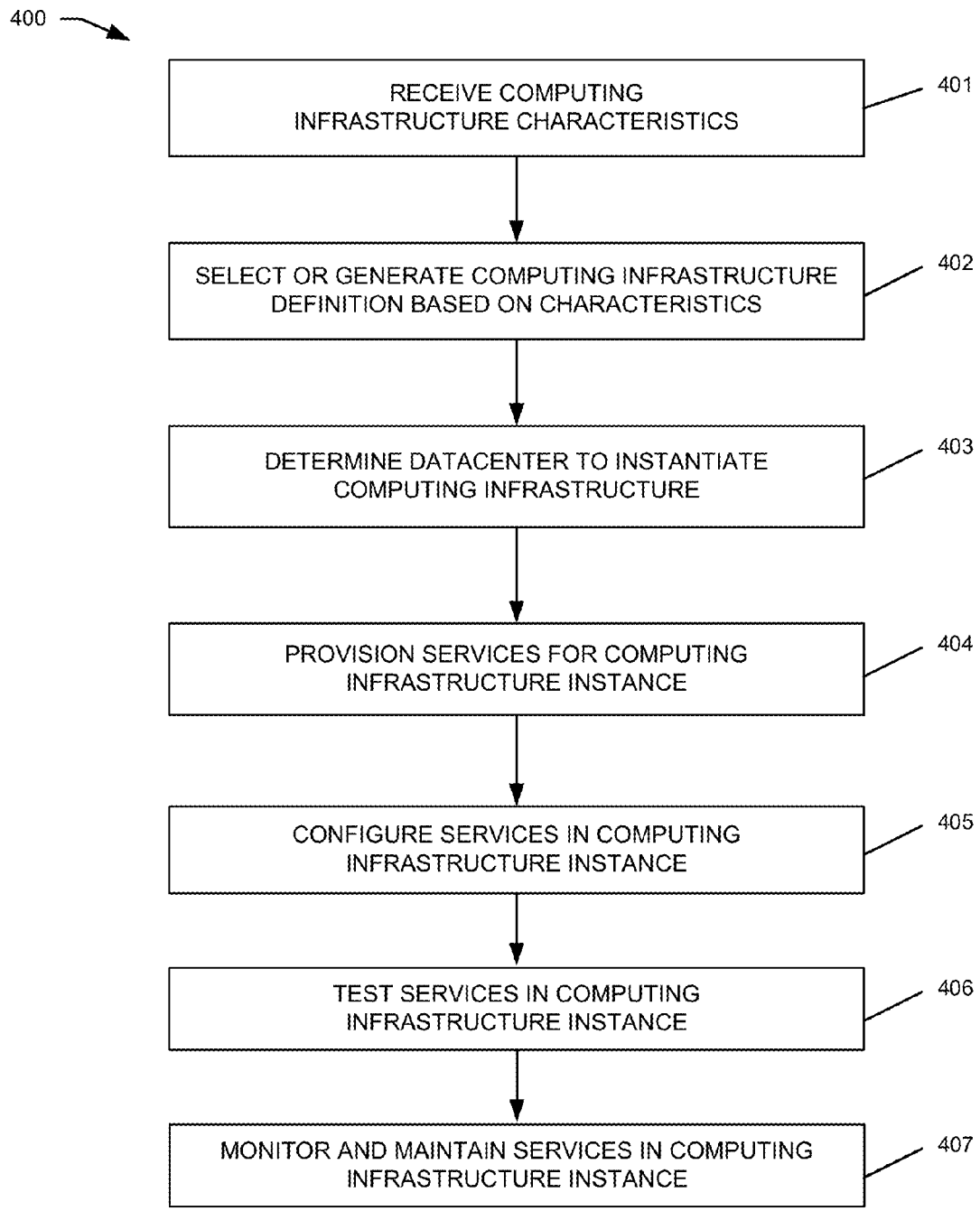
FIG. 4 is a flowchart illustrating an example process of generating a computing infrastructure instance within a datacenter, in accordance with one or more embodiments of the present invention.

Referring now to FIG. 4, a flow diagram is shown illustrating a process of generating a computing infrastructure instance within one or more datacenters. As described below, the steps in this process may be performed by one or more components in the example system 300 discussed above, such as computing infrastructure orchestration systems 320, cloud computing platforms 310 and/or user devices 330. However, it should be understood that process steps such as receiving and analyzing computing infrastructure characteristics, selecting or creating computing infrastructure definitions, determining a datacenter for an instance, provisioning and configuring an instance, and the like, need not be limited to the specific systems and hardware implementations described above in FIGS. 1-3, but may be performed within other computing environments comprising other combinations of the hardware and software components described herein.

In step 401, one or more characteristics of an existing or potential computing infrastructure instance may be received, for example, by the computing infrastructure orchestration system 320 in system 300. In some examples, computing infrastructure characteristics received in step 401 may include listings of individual web services along with the provisioning and configuration settings of the web services and descriptions of the interactions between web services. Alternatively or additionally, the characteristics received in step 401 may include characteristics of a computing infrastructure instance 315 as a whole, such as the type and functional purpose of the instance 315, storage and computing requirements, network and security requirements, and the like. As discussed below, the characteristics received in step 401 may include data files associated with provisioning and/or configuration tools (e.g., Chef recipes, Puppet manifests, etc.).

In some cases, the computing infrastructure characteristics may be received from a user device 330 via a client interface 321. In such cases, the received characteristics may describe a computing infrastructure instance to be created. Alternatively, a set of characteristics may be retrieved in step 401 directly from a cloud computing platform 310 or other datacenters, in which case the characteristics may describe an existing computing infrastructure instance 315 to be analyzed, saved, cloned, etc. In either case, various client interfaces (e.g., command-line interfaces, graphical interfaces, API's, etc.) may be supported by the orchestration system 320 to allow users to define sets of computing infrastructure characteristics that may be used to generate, manage, retrieve, store, and/or clone one or more instances 315.

Referring briefly to FIG. 5, an example graphic user interface 500 is shown by which a user may input a desired set of characteristics for a specific type of computing infrastructure, in this case, a computing infrastructure for Internet website hosting. In this example, after the user has indicated the desired type of computing infrastructure (i.e., hosting of Internet Site/Services), the user interface 500 may allow the user to input a set predetermined characteristics relating to Internet site hosting services. As shown in this example, user's may define the site type (e.g., DRUPAL, JOOMLA, WORDPRESS, etc.), the anticipated amount of traffic on the site (e.g., an anticipated number of hits per day, transactions, downloads, anticipated requirements of computing resources or bandwidth, etc.), and any traffic patterns or spikes anticipated for the web site. For instance, depending on the subject-matter and functions provided by a web site, traffic spikes may occur at different times of the day, week, month, or year, etc. Computing infrastructure instances 315 with predictable traffic patterns or spikes may include, for example, eCommerce web sites, political web sites, sports web sites, educational institution resources, business resources, etc. Additional characteristics that a user may provide in this example include required amounts of data storage and throughput for the web site, whether or not email is enabled, and user-selectable lists of optional storage features and/or security features that may be provisioned for the web site. Finally, user interface 500 includes a set of sliders that allow the user to indicate their priorities for the web site with respect to cost, performance, availability, and stability. It should be understood that the set of computing infrastructure characteristics discussed in reference to user interface 500 are illustrative only and non-limiting. As noted above, the characteristics received in step 401 may correspond to any characteristic of a service or computing infrastructure instance, including supported operations/methods, build/installation details, configuration settings, and the like.

Referring now to step 402, the computing infrastructure orchestration system 320 may use the characteristics received in step 401 to determine a computing infrastructure definition to be instantiated within a datacenter (e.g., cloud computing platform 310). In some embodiments, the characteristics received in step 401 may be compared to a plurality of computing infrastructure definitions stored in a data store 325 to identify one or more matching definitions. For example, referring again to user interface 500, after the user has provided a set of preferences and requirements for the desired web site via the interface, the orchestration engine 322 may use these input characteristics to select an existing computing infrastructure definition from the data store 325 that best satisfies the requirements and preferences for the site. As discussed above, the computing infrastructure definition(s) selected in step 402 may describe a predetermined set of interoperable hardware and software components which may provide a desired set of web services in a datacenter. Such definitions may include listings of services and other components, including specific builds, versions, installation settings, configuration settings, and the like, along with the interconnections of multiple the services within an instance 315.

In some embodiments, the infrastructure characteristics received in step 401 may correspond to multiple computing infrastructure definitions, or might not correspond to any definitions. In such cases, the orchestration engine 322 may retrieve addition user input via the client interface 321, for example, to obtain additional characteristics that narrow down the corresponding set of computing infrastructure definitions, or to remove (or broaden) certain characteristics that may allow for a matching definition to be identified. Additionally, in some cases, the orchestration engine 322 may identify a number of closest matching definitions (e.g., the closest 2, 3, or 4 definitions, etc.) and then may run an interpolation process between the closest matching definitions in order to create a closer matching computing infrastructure definition than any of the currently available definitions in the existing library 325.

Additionally, in some cases, one or more computing infrastructure definitions may be created and stored within the data store 325 in step 402, rather than selecting existing definitions from the data store 325. For example, if the characteristics received in step 401 correspond to a set of provisioning and/or configurations files (e.g., Chef recipes, Puppet manifests, etc.), then the orchestration engine 322 may extract the computing infrastructure definition from the data files. In some cases, the orchestration engine 322 may analyze the files to determine the services to be provisioned and configured, while removing dependence on any specific provisioning tools 323, configuration management tools 324, or any specific datacenter. The resulting computing infrastructure definition, which may therefore be agnostic with respect cloud service providers, cloud computing platforms and/other non-cloud datacenters, and with respect to provisioning and configuration tools, then may be stored within the data store 325 for potential future selections and instantiations.

In step 403, the computing infrastructure orchestration engine 320 may determine one or more specific datacenters 310 on which to instantiate the computing infrastructure definition(s) determined in step 402. In some embodiments, associated between computing infrastructure definitions and preferred (or required) datacenters may be stored, for example, within data store 325. In other examples, the orchestration engine 322 may dynamically select a datacenter 310 on the fly based on, for instance, a predetermined set of compatibility preferences/requirements between definitions and datacenter providers (e.g., cloud service providers, on-premise datacenter providers, etc.), analytics of instance monitoring data received from instance monitor components 316 executing within multiple different datacenters 310, and/or current load and performance data within each of the datacenters 310 current available within the system. Thus, in some cases, a particular computing infrastructure definition might always be instantiated on the same particular datacenter 310. In other cases, a computing infrastructure definition may preferably be instantiated on a primary datacenter 310, but might be instantiated on an alternative datacenter 310 based on the current number of services and recent load and performance data on the primary datacenter 310.

In some embodiments, an orchestration system 320 may permit users to select specific datacenters 310 for instantiating computing infrastructure definitions. For example, after determining a definition to instantiate in step 402, the orchestration system 320 may provide the user device 330 with a selectable list of compatible and/or available platforms 310 on which the definition may be instantiated. In some examples, the orchestration system 320 may suggest or rank the selectable list of platforms based on previously identified compatibility issues between definitions and platforms 310, current load data on different platforms 310, current available resources, current request latency, and the like.

In steps 404-407, the orchestration system 320 may generate a computing infrastructure instance 315 corresponding to the definition determined in step 402, within the datacenter 310 determined in step 403. As shown in this example, generating an instance 315 may include multiple distinct steps in some embodiments. For example, in step 404, the orchestration engine 322 may select and invoke one or more provisioning software tools 323 to create the components within the determined datacenter 310. In some cases, a provisioning software tool 323 may be selected from multiple different provisioning software tools 323 based on the components/services to be created, and/or the selected platform 310. In step 405, the orchestration engine 322 may select and invoke one or more configuration management tools 324 to configure the components/services in accordance with the determined computing infrastructure definition. The specific configuration management tool(s) 324 used in step 405 may be selected based on the components/services to be created, the selected platform 310, and/or the configurations to be performed. In step 406, the orchestration engine 322 may use the API's and/or instance test tools to test the provisioned and configured computing infrastructure instance 315. Finally, in step 407, the configuration management tools 324 may monitor and maintain the services within the instance 315 to ensure the state is being kept.

With respect to the generation of the computing infrastructure instance 315, it should be understood that steps 404-407 may be combined, executed in different order, and/or repeated for different components/services. As discussed above, certain computing infrastructure definitions may include complex sets of many different interoperable services, each of which may have detailed and specific technical configuration requirements. In such cases, the generation of the computing infrastructure instance 315 may require executing one or more specific sequences of provisioning and configuring services. For example, generating a desired instance 315 may require performing (in sequence) provisioning a first service, partial configuration of the first service with a first set of configuration parameters, provisioning a second service, additional configuration of the first and second services with a second set of configuration parameters, provisioning a third service, and so on. These sequences of provisioning and configuration actions may be embodied within the definition records and/or files retrieved in step 402. Moreover, such sequences may depend on the specific provisioning and configuration tools used (e.g., Chef recipes, Puppet manifests, etc.), and/or on the datacenter 310.

Figure 6:
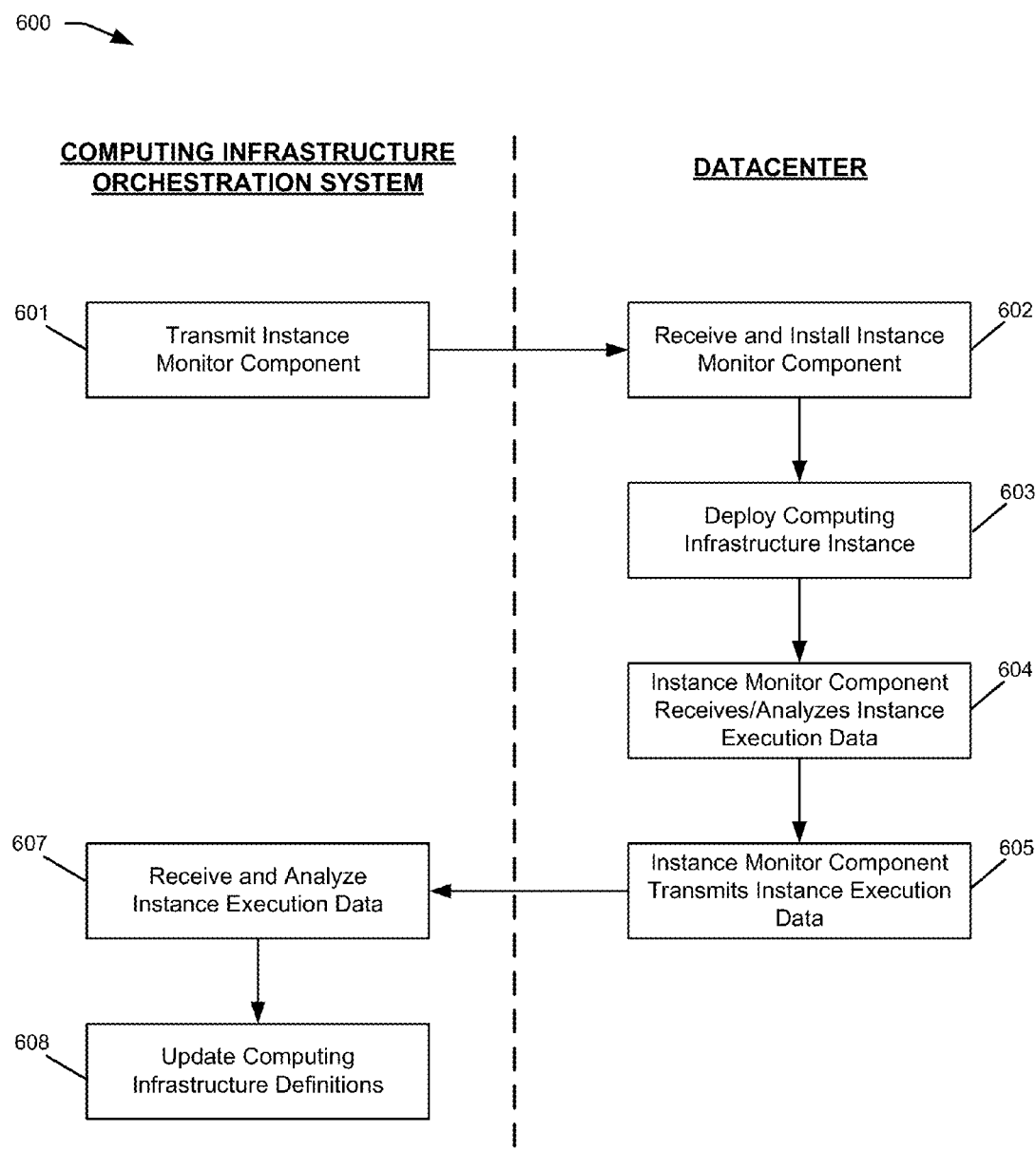
FIG. 6 is a flowchart illustrating an example process of receiving and analyzing instance execution data via an instance monitor component, in accordance with one or more embodiments of the present invention.

Referring now to FIG. 6, a flow diagram is shown illustrating a process of receiving and analyzing instance execution data via an instance monitor component. As described below, the steps in this process may be performed by one or more components in the example system 300 discussed above, such as the computing infrastructure orchestration systems 320 in conjunction with one or more datacenters 310. However, it should be understood that process steps such as determining and transmitting instance monitor components to datacenters, deploying and invoking the instance monitor components with computing infrastructure instances, analyzing data collected by instance monitor components, and the like, need not be limited to the specific systems and hardware implementations described above in FIGS. 1-3, but may be performed within other computing environments comprising other combinations of the hardware and software components described herein.

In step 601, an instance monitor component may be transmitted from a computing infrastructure orchestration system 320 to one or more datacenters 310. In some embodiments, instance monitor components 316 may include software objects configured to execute within specific datacenters 310 and/or specific instances 315. Instance monitor components 316 also may be implemented as intelligence aggregators in some embodiments. For example, instance monitor components 316 may be implemented as executable software daemons configured to run as background processes within computing infrastructure instances 315 and monitor the execution of the web services and other components within a computing infrastructure instance 315. In some examples, instance monitor components 316 need not be executable software objects but instead may include data files or input parameters that may be used by the pre-existing monitoring infrastructure (e.g., service and performance logs) within a datacenter 310.

In some embodiments, an instance monitor component 316 may be compatible with many different computing infrastructure instances 315. For example, some components 316 may be configured to leverage the internal monitoring infrastructure of the cloud computing platforms 310 of certain cloud service providers. In other cases, an instance monitor component (e.g., 316*a*) may be designed and implemented specifically for deployment within a single computing infrastructure instance (e.g., 315*a*). Thus, a single orchestration system 320 may retrieve and transmit multiple different instance monitor components 316 to different datacenters 310.

Transmitting instance monitor components 316 in step 601 may be performed during or after the generation of the corresponding instance 315, described above in steps 404-407. In some cases, the instance monitor component 316, along with the instructions for deploying and configuring the component 316, may be identified within the computing infrastructure definition received in step 402.

In step 602, the datacenter 310 may receive and installed the instance monitor component 316 within the corresponding computing infrastructure instance 315. In step 603, the instance 315 is deployed and instantiated, although with the instance monitor component 316. After both the instance 315 and the component 316 have been instantiated and are executing within the datacenter 310, the component 316 may automatically begin to monitor the execution of each web service running within the instance 315.

In some cases, instance monitor components 316 may be configured to collect various log data (e.g., errors and exceptions, function calls, performance data, etc.) associated with one or more services within a computing infrastructure instance 315. Such data may include, for example, response time, active number of sessions, database accesses per second, and the like. For specific hardware, performance data may include, for example, the amount of available memory, CPU usage, available disk space, number of network cards, and/or what provisioner was used for specific services and/or instances 315. Additionally, instance monitor components 316 may implement specific thresholds for service behavior, datacenter resource usage, and the like (e.g., related to memory usage, CPU usage, requests per second). In such cases, an instance monitor component 316 may perform certain tasks (e.g., logging, analyzing, or transmitting data, etc.) only when the applicable thresholds have been met. Such thresholds may be set by users via the client interface 321, and/or may be preconfigured by the orchestration system 320.

As previously discussed, computing infrastructure instances (e.g., 220, 315, etc.) may include multiple interoperable services and other components that may execute autonomously using the hardware and software resources of the datacenter 310. Different components may provide services at one or more different functional layers, for example, storage resources, network resources, computing resources, virtual machines, operating systems, database applications, middleware applications, and user applications. Components at each of these different functional layers may be configured to monitor, capture, and transmit their own operational status data, for instance, to the system log files or directly to the instance monitor component 316. For example, storage resources 221 may create and transmit data including operational status data indicating the usage, status, and health of each hard disk drive (HDD) in its various storage arrays. In contrast, a user application 228 may transmit create and transmit data including operational status data indicating software exceptions, user logins and access data, current status and health, data from event logs and application logs, and the like. In such examples, the components and services within all layers 221-228 of an instance 220 may include the hardware and software components to perform the self-monitoring and reporting of its data, directly or indirectly to the instance monitor component 316.

In step 605, the instance monitor component 316 may run continuously during the execution of the corresponding instance 315, collecting and analyzing execution data received from the various services within the instance 315. In step 606, the instance monitor component 316 may transmit the instance execution data back to the orchestration system 320. In different embodiments, different levels of analyses may be performed by the instance monitor component 316 in step 605, before transmitting the data in step 606. For example, a basic instance monitor component 316 may be configured to execute with low overhead and minimal computing resources, and thus might collect and transmit the execution data from the services instance with no or minimal analyses. In contrast, more complex instance monitor components 316 may perform various different analyses on the data before transmitting the analyses outputs and/or the underlying raw data back to the orchestration system 320. For such complex instance monitor components 316, the components 316 may autonomously determine whether or not specific data should be transmitted back to the orchestration system 320, using thresholds, predictive analyses, and other analyses techniques. Additionally, in some embodiments, instance monitor components 316 may be configured to transmit the instance execution data to one or more user devices 330, instead of or in addition to the orchestration system 320.

In step 607, the orchestration system 320 may receive the instance execution data transmitted by the instance monitor component 316 in step 606. As shown in FIG. 6, the data transmitted from the instance monitor component 316 back to the orchestration system 320 need not be transmitted using the API's of the datacenter 310. In fact, it may be advantageous not to use the platform's API's in some embodiments, to maintain independence and portability between different datacenters (e.g., different cloud computing platforms 310). Additionally, although steps 606 and 607 describe instance execution data of single computing infrastructure instance 315, it should be understood that a single orchestration system 320 may receive many transmissions of instance execution data from different instances 315 and/or at time intervals.

In step 608, the orchestration system 320 may analyze the instance execution data received in step 607, and based on the data, may determine one or more updates to the computing infrastructure definitions stored within the system 300 (e.g., within the computing infrastructure definition data store 325). As noted above, the orchestration system 320 may receive and store multiple instance execution data transmitted by different computing infrastructure instances 315 at different times. By collecting and analyzing repositories of such data, for example, using an analytics engine executing within the orchestration system 320, the orchestration engine 322 may identify better and worse instances 315, services, configurations, etc. As an example, an analytics engine may be used to compare the execution data from two similar (or even identical) instances 315 deployed on different datacenters 310. Such comparisons may be based a number of execution errors, various measurements of performance data, handling of network traffic spikes, usage amounts and variations of datacenter/cloud resources (which may impact costs owed to the cloud service provider or other datacenter provider), and the like. In various other examples, the orchestration engine 322 may compare instance execution data from different services or sets of services instantiated on the similar (or identical) datacenters 310, or similar (or identical) services or sets of services having different configuration settings. Such comparisons, when repeated over time with consistent results, may allow the orchestration engine 322 to identify which computing infrastructure definitions perform better and worse, optimal and suboptimal, with respect to the various criteria and priorities that different users may have for computing infrastructure instances 315 (e.g., cost, performance, availability, scalability, etc.). Additionally, users may be informed and prompted via interface 321 with the results of the comparisons and analyses, along with recommendations to switch to different computing infrastructure definitions, switch to different datacenters 310 for instantiating different definitions, etc.

Figure 7:
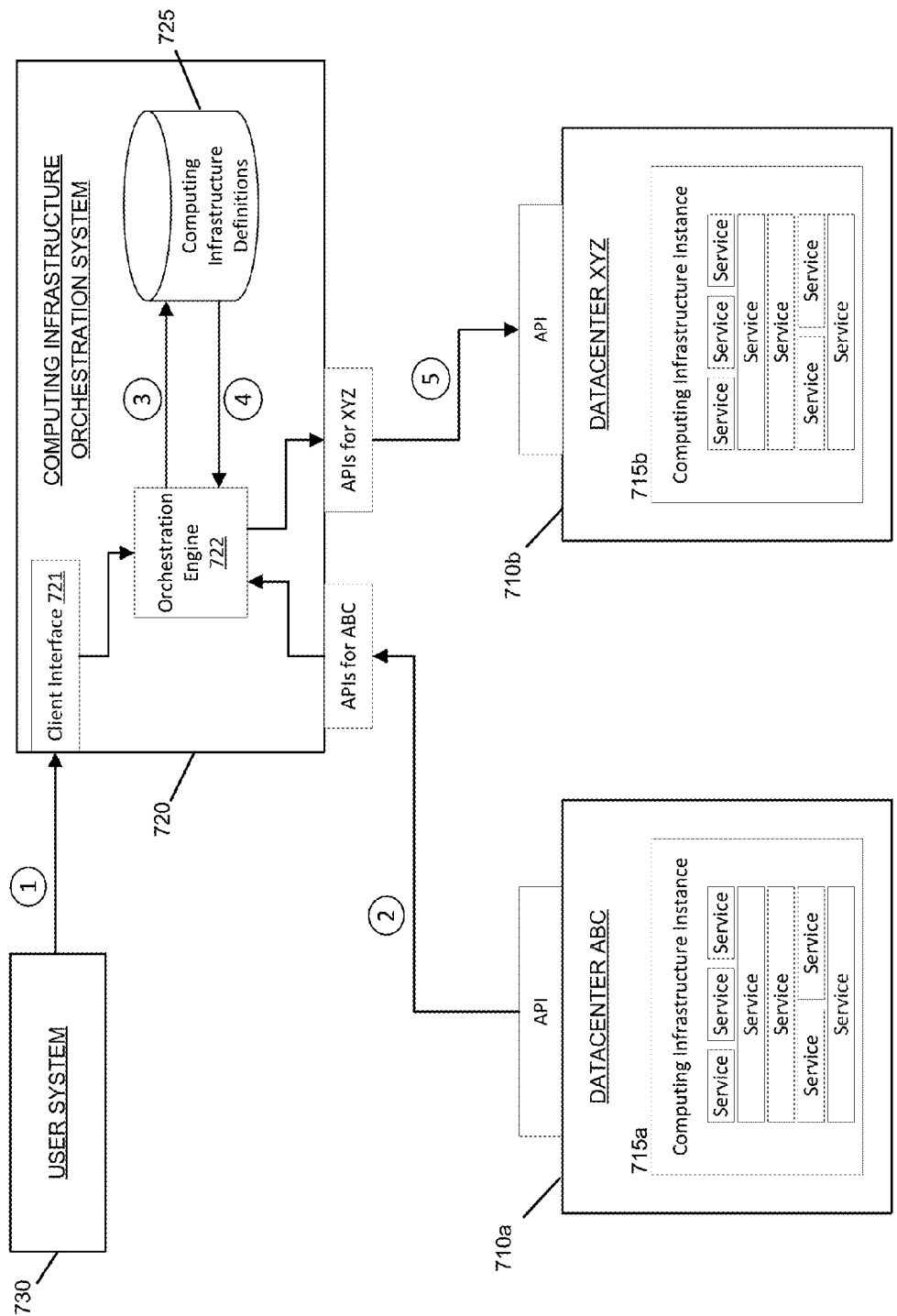
FIGS. 7 and 8 are block diagrams illustrating techniques for generating computing infrastructure instances within a datacenter, based on corresponding computing infrastructure instances within another datacenter, in accordance with one or more embodiments of the present invention
Figure 8:
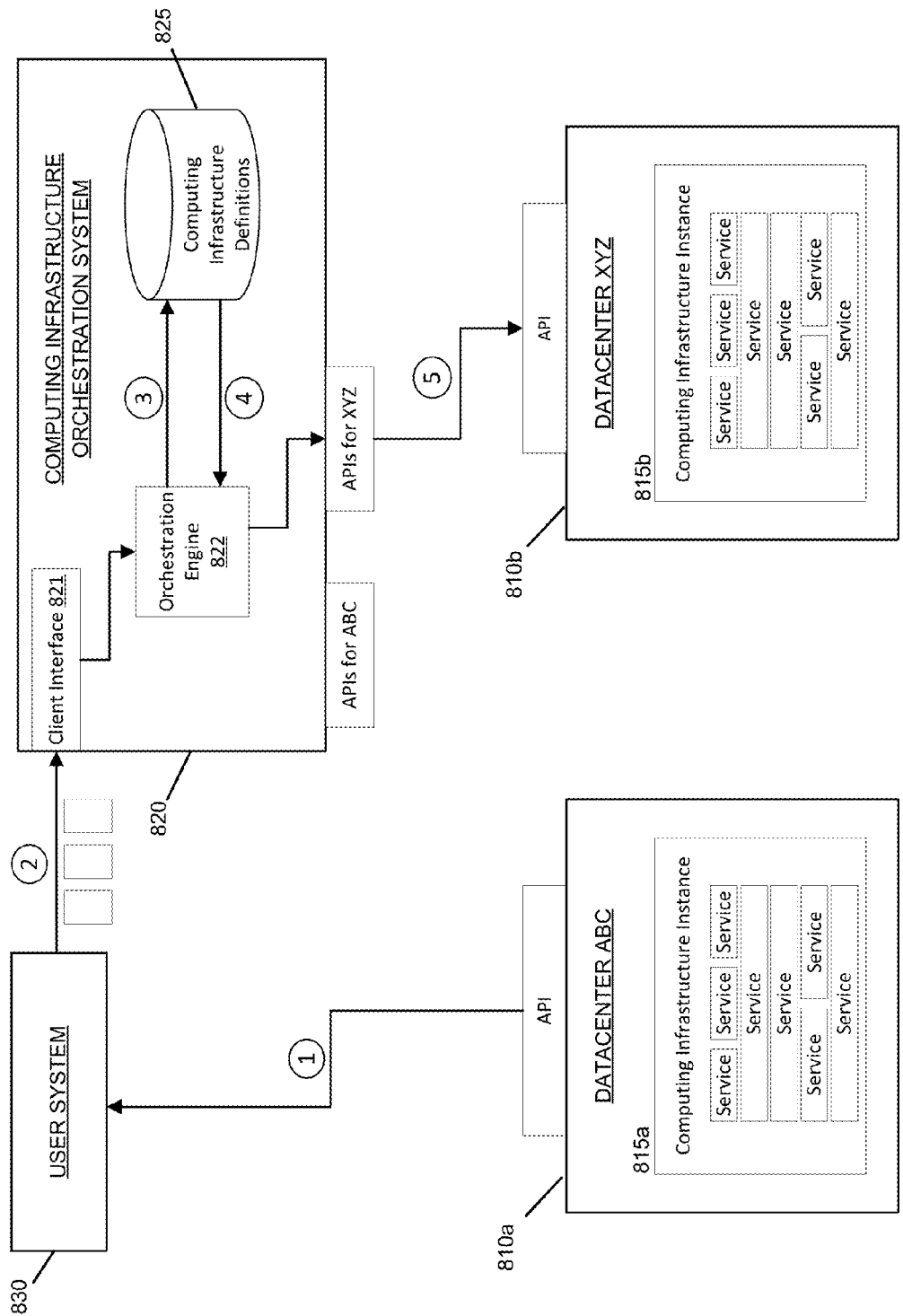

Referring now to FIG. 7 and FIG. 8, two different examples are shown of specific implementations of the general techniques described above for generating and managing computing infrastructure instances within datacenters (e.g., cloud computing platforms 310). In both examples, a user device and computing infrastructure orchestration system may collaborate to copy (or clone) an instance from one datacenter to a different datacenter.

As shown in FIG. 7, a user at a user system 730 may initiate the cloning process by requesting via the client interface 721 (Step 1) that the orchestration system 720 clone a first instance 715a instantiated on a first datacenter 710a, on a second different datacenter 710b. In response to the request from the user device, the orchestration engine 722 may use the API's of both the orchestration system 720 and the first datacenter 710a, to retrieve the service descriptions/definitions, configuration data, etc., for the first instance 715a (Step 2). The orchestration engine 722 may access the computing infrastructure definition data store 725 (Step 3), using the service and configuration data of the first instance 715a, to retrieve corresponding service and configuration data (Step 4) compatible with the second datacenter 710b.

As discussed above, in some embodiments, computing infrastructure definitions may be stored as provisioner-specific or provisioner-agnostic, and datacenter/cloud provider-specific or datacenter/cloud provider-agnostic data records or files defining specific computing infrastructures. Accordingly, in some embodiments, the orchestration engine 722 may first extract certain provisioner and datacenter/cloud provider data before querying the data store 725 in Step 3 to retrieve the corresponding provisioner-agnostic and/or datacenter/cloud provider-agnostic definitions. In other examples, the orchestration engine 722 may query the data store 725 in Step 3 to identify the appropriate provisioner-specific and/or datacenter/cloud provider-specific definitions for the second datacenter 710b, based on the related definitions for the first datacenter 710a. Finally, the orchestration engine 722 may provision and configure the second computing infrastructure instance 715b within the second datacenter 710b (Step 5), to match the first computing infrastructure instance 715a in the first datacenter 710a.

Referring to FIG. 8, another example is shown of a technique for cloning a computing infrastructure instance 815a from one datacenter 810a to another datacenter 810b. In this example, the user system 830 first obtains computing infrastructure characteristic data describing instance 815a directly from the datacenter 810a (Step 1). The user system 830 then may provide the infrastructure characteristic data to the orchestration system 820 (Step 2). As shown in this example, the infrastructure characteristic data may be embodied by a set of data files, for instance, Chef recipe files, Puppet manifest files, etc. The orchestration engine 822 may access the computing infrastructure definition data store 825 (Step 3), using the computing infrastructures characteristics of the first instance 815a, to retrieve corresponding infrastructures characteristic data (Step 4) to instantiate the instance 815b within second datacenter 710b. In some examples, Steps 3 and 4 may involve retrieving a set of provisioning and configuration files of a first provisioner type (e.g., Chef recipes) based on a set of provisioning and configuration files of a different provisioner type (e.g., Puppet manifests), or vice versa. Finally, the orchestration engine 822 may provision and configure the second computing infrastructure instance 815b within the second datacenter 810b (Step 5), to match the first computing infrastructure instance 815a in the first datacenter 810a.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

Figure 9:
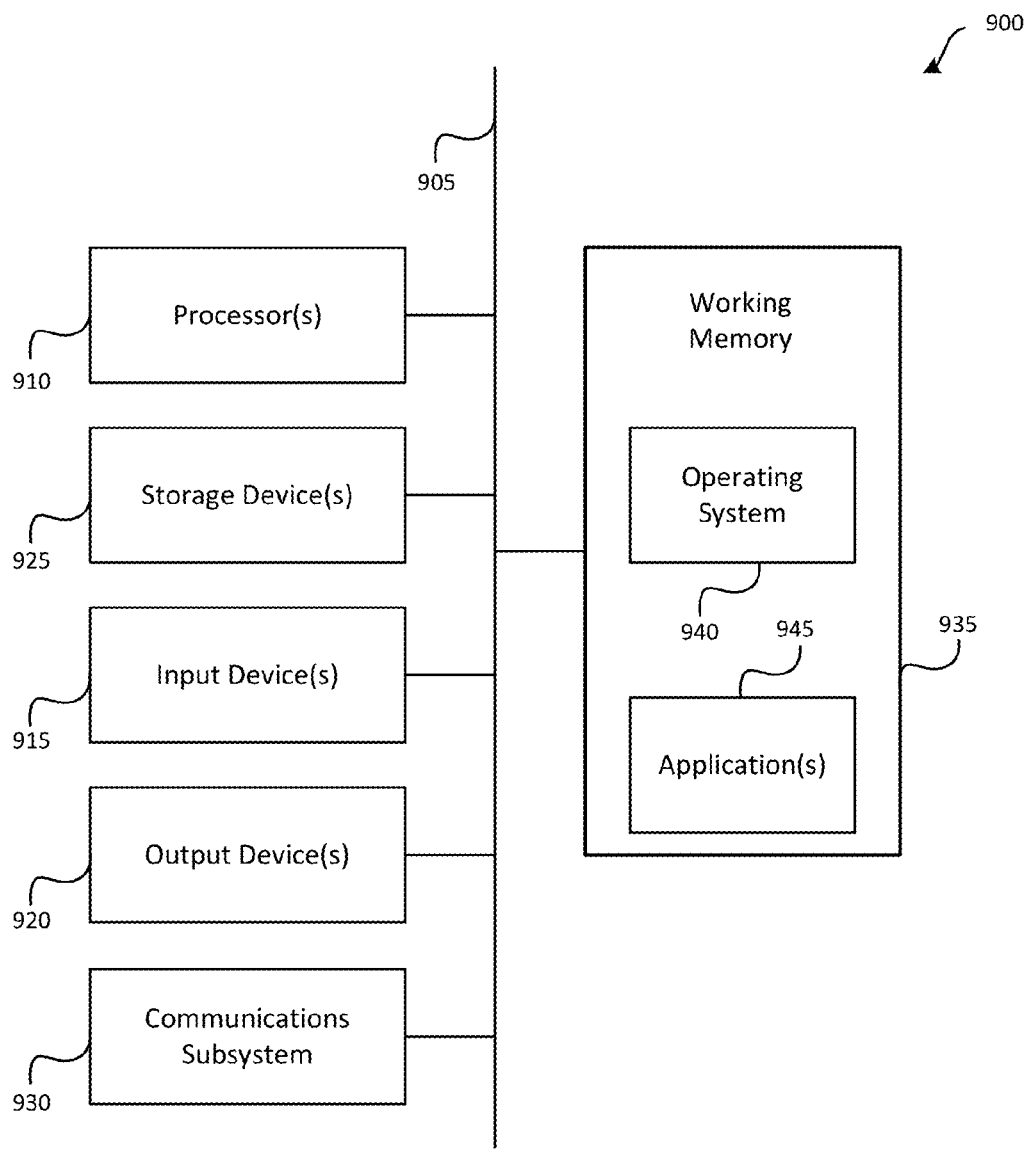
FIG. 9 is a schematic illustration of an embodiment of a computer system, in accordance with one or more embodiments of the present invention.

A computer system as illustrated in FIG. 9 may be incorporated as part of the previously described systems, such as to execute the client interface, perform the functionality of orchestration systems and/or datacenters, etc. FIG. 9 provides a schematic illustration of one embodiment of a computer system 900 that can perform various steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, video decoders, and/or the like); one or more input devices 915, which can include without limitation a mouse, a keyboard, remote control, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the non-transitory storage device(s) 925. Merely by way of example, execution of the sequences of instructions contained in the working memory 935 might cause the processor(s) 910 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910.

It should further be understood that the components of computer system 900 can be distributed across a network. For example, some processing may be performed in one location using a first processor while other processing may be performed by another processor remote from the first processor. Other components of computer system 900 may be similarly distributed. As such, computer system 900 may be interpreted as a distributed computing system that performs processing in multiple locations. In some instances, computer system 900 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method of creating a computing infrastructure instance on a datacenter, comprising:
    receiving, at a computer system, data identifying one or more computing infrastructure characteristics;
    determining, by the computer system, a first data structure comprising a first computing infrastructure definition, based on the received computing infrastructure characteristics;
    determining, by the computer system, a first datacenter associated with the first computing infrastructure definition;
    determining, by the computer system, at least one of a provisioning software tool or a configuration management software tool, based on the first computing infrastructure definition and based on the first datacenter; and
    generating, by the computer system, a computing infrastructure instance within the first datacenter corresponding to the first computing infrastructure definition, using the at least one provisioning software tool or configuration management software tool, wherein generating the computing infrastructure instance within the first datacenter comprises:
        transmitting a software component to the first datacenter, the software component configured to (1) execute within the first datacenter, (2) monitor execution of the computing infrastructure instance within the first datacenter, and (3) transmit monitoring data to the computer system, the monitoring data describing the execution of the computing infrastructure instance; and
        receiving, by the computer system and from the software component executing within the first datacenter, the monitoring data describing the execution of the computing infrastructure instance within the first datacenter.

2. The method of claim 1, wherein the software component comprises an executable daemon configured to run as a background process within the first datacenter.

3. The method of claim 1, wherein determining the first datacenter comprises:
    identifying a plurality of datacenters, each having computing resources capable of supporting an instance of the first computing infrastructure definition; and
    selecting the first datacenter from the plurality of datacenters, based on the received computing infrastructure characteristics.

4. The method of claim 1, wherein the first datacenter comprises a first cloud computing platform, and wherein the first computing infrastructure definition stored on the first data structure comprises a sequence of ordered instructions to provision and configure a plurality of interoperable cloud-based services.

5. The method of claim 4, wherein the plurality of interoperable cloud-based services comprises:
    at least one cloud storage service;
    at least one cloud network service;
    at least one virtual server; and
    at least one application configured to execute on the at least one virtual server.

6. The method of claim 4, wherein determining the first data structure comprising the first computing infrastructure definition comprises:
  selecting, based on the received computing infrastructure characteristics, the first data structure from a plurality of data structures previously stored within the computer system, wherein each of the plurality of data structures stores a computing infrastructure definition.

7. A method of creating a computing infrastructure instance on a datacenter, comprising:
  receiving, at a computer system, data identifying one or more computing infrastructure characteristics,
  determining, by the computer system, a first data structure comprising a first computing infrastructure definition, based on the received computing infrastructure characteristics, wherein the first computing infrastructure definition stored on the first data structure comprises a sequence of ordered instructions to provision and configure a plurality of interoperable cloud-based services, wherein determining the first data structure comprising the first computing infrastructure definition comprises:
    determining the plurality of interoperable cloud-based services, based on the received computing infrastructure characteristics;
    determining the sequence of ordered instructions to provision and configure the plurality of interoperable cloud-based services; and
    generating the first data structure containing the sequence of ordered instructions to provision and configure the plurality of interoperable cloud-based services;
  determining, by the computer system, a first datacenter associated with the first computing infrastructure definition, wherein the first datacenter comprises a first cloud computing platform;
  determining, by the computer system, at least one of a provisioning software tool or a configuration management software tool, based on the first computing infrastructure definition and based on the first datacenter; and
  generating, by the computer system, a computing infrastructure instance within the first datacenter corresponding to the first computing infrastructure definition, using the at least one provisioning software tool or configuration management software tool.

8. A method of creating a computing infrastructure instance on a datacenter, comprising:
  receiving, at a computer system, data identifying one or more computing infrastructure characteristics;
  determining, by the computer system, a first data structure comprising a first computing infrastructure definition, based on the received computing infrastructure characteristics;
  determining, by the computer system, a first datacenter associated with the first computing infrastructure definition, wherein the first datacenter comprises a first cloud computing platform;
  determining, by the computer system, at least one of a provisioning software tool or a configuration management software tool, based on the first computing infrastructure definition and based on the first datacenter; and
  generating, by the computer system, a computing infrastructure instance within the first cloud computing platform corresponding to the first computing infrastructure definition, using the at least one provisioning software tool or configuration management software tool, wherein generating the computing infrastructure instance within the first cloud computing platform comprises:
    initiating execution of a first software tool configured to provision the computing infrastructure instance within the first cloud computing platform;
    providing as input to the first software tool, data corresponding to one or more application programming interfaces (APIs) associated with the first cloud computing platform;
    receiving and storing output data from the first software tool;
    initiating execution of a second configuration management software tool; and
    providing as input to the second configuration management software tool, the output data received from the first software tool.

9. The method of claim 8, wherein receiving the data identifying the computing infrastructure characteristics comprises:
  receiving a software file associated with the at least provisioning software tool or configuration management software tool, the software file containing instructions for provisioning or configuring a previously-generated computing infrastructure instance; and
  extracting the computing infrastructure characteristics from the software file.

10. A computing infrastructure orchestration system, comprising:
  a processing unit comprising one or more processors; and
  memory coupled with and readable by the processing unit and storing therein a set of instructions which, when executed by the processing unit, causes the processing unit to:
    receive data identifying one or more computing infrastructure characteristics;
    determine a first data structure comprising a first computing infrastructure definition, based on the received computing infrastructure characteristics;
    determine a first datacenter associated with the first computing infrastructure definition;
    determine at least one of a provisioning software tool or a configuration management software tool, based on the first computing infrastructure definition and based on the first datacenter; and
    generate a computing infrastructure instance within the first datacenter corresponding to the first computing infrastructure definition, using the at least one provisioning software tool or configuration management software tool, wherein generating the computing infrastructure instance within the first datacenter comprises:
      transmitting a software component to the first datacenter, the software component configured to (1) execute within the first datacenter, (2) monitor execution of the computing infrastructure instance within the first datacenter, and (3) transmit monitoring data to the computer system, the monitoring data describing the execution of the computing infrastructure instance; and
      receiving, by the computer system and from the software component executing within the first datacenter, the monitoring data describing the execution of the computing infrastructure instance within the first datacenter.

11. The system of claim 10, wherein determining the first datacenter comprises:

identifying a plurality of datacenters, each having computing resources capable of supporting an instance of the first computing infrastructure definition; and selecting the first datacenter from the plurality of datacenters, based on the received computing infrastructure characteristics.

12. The system of claim 10, wherein the first datacenter comprises a first cloud computing platform, and wherein the first computing infrastructure definition stored on the first data structure comprises a sequence of ordered instructions to provision and configure a plurality of interoperable cloud-based services.

13. The system of claim 12, wherein the plurality of interoperable cloud-based services comprises:
   at least one cloud storage service;
   at least one cloud network service;
   at least one virtual server; and
   at least one application configured to execute on the at least one virtual server.

14. The system of claim 12, wherein determining the first data structure comprising the first computing infrastructure definition comprises:
   selecting, based on the received computing infrastructure characteristics, the first data structure from a plurality of data structures previously stored within the computer system, wherein each of the plurality of data structures stores a computing infrastructure definition.

15. A computing infrastructure orchestration system, comprising:
   a processing unit comprising one or more processors; and
   memory coupled with and readable by the processing unit and storing therein a set of instructions which, when executed by the processing unit, causes the processing unit to:
      receive data identifying one or more computing infrastructure characteristics;
      determine a first data structure comprising a first computing infrastructure definition, based on the received computing infrastructure characteristics, wherein the first computing infrastructure definition stored on the first data structure comprises a sequence of ordered instructions to provision and configure a plurality of interoperable cloud-based services, wherein determining the first data structure comprising the first computing infrastructure definition comprises:
         determining the plurality of interoperable cloud-based services, based on the received computing infrastructure characteristics;
         determining the sequence of ordered instructions to provision and configure the plurality of interoperable cloud-based services; and
         generating the first data structure containing the sequence of ordered instructions to provision and configure the plurality of interoperable cloud-based services;
      determine a first datacenter associated with the first computing infrastructure definition, wherein the first datacenter comprises a first cloud computing platform;
      determine at least one of a provisioning software tool or a configuration management software tool, based on the first computing infrastructure definition and based on the first datacenter; and
      generate a computing infrastructure instance within the first datacenter corresponding to the first computing infrastructure definition, using the at least one provisioning software tool or configuration management software tool.

16. A non-transitory computer-readable memory comprising a set of instructions stored therein which, when executed by a processor, causes the processor to:
   receive data identifying one or more computing infrastructure characteristics;
   determine a first data structure comprising a first computing infrastructure definition, based on the received computing infrastructure characteristics;
   determine a first cloud computing platform associated with the first computing infrastructure definition;
   determine at least one of a provisioning software tool or a configuration management software tool, based on the first computing infrastructure definition and based on the first cloud computing platform; and
   generate a computing infrastructure instance within the first cloud computing platform corresponding to the first computing infrastructure definition, using the at least one provisioning software tool or configuration management software tool, wherein generating the computing infrastructure instance within the first cloud computing platform comprises:
      transmitting a software component to the first cloud computing platform, the software component configured to (1) execute within the first cloud computing platform, (2) monitor execution of the computing infrastructure instance within the first cloud computing platform, and (3) transmit monitoring data describing the execution of the computing infrastructure instance; and
      receiving, from the software component executing within the first cloud computing platform, the monitoring data describing the execution of the computing infrastructure instance within the first cloud computing platform.

17. The computer-readable memory of claim 16, wherein the first computing infrastructure definition stored on the first data structure comprises a sequence of ordered instructions to provision and configure a plurality of interoperable cloud-based services, and wherein determining the first data structure comprising the first computing infrastructure definition comprises:
   determining the plurality of interoperable cloud-based services, based on the received computing infrastructure characteristics;
   determining the sequence of ordered instructions to provision and configure the plurality of interoperable cloud-based services; and
   generating the first data structure containing the sequence of ordered instructions to provision and configure the plurality of interoperable cloud-based services.

18. A computing infrastructure orchestration system, comprising:
   a processing unit comprising one or more processors; and
   memory coupled with and readable by the processing unit and storing therein a set of instructions which, when executed by the processing unit, causes the processing unit to:
      receive data identifying one or more computing infrastructure characteristics;

determine a first data structure comprising a first computing infrastructure definition, based on the received computing infrastructure characteristics;

determine a first datacenter associated with the first computing infrastructure definition, wherein the first datacenter comprises a first cloud computing platform;

determine at least one of a provisioning software tool or a configuration management software tool, based on the first computing infrastructure definition and based on the first datacenter; and generate a computing infrastructure instance within the first cloud computing platform corresponding to the first computing infrastructure definition, using the at least one provisioning software tool or configuration management software tool, wherein generating the computing infrastructure instance within the first cloud computing platform comprises:

initiating execution of a first software tool configured to provision the computing infrastructure instance within the first cloud computing platform;

providing as input to the first software tool, data corresponding to one or more application programming interfaces (APIs) associated with the first cloud computing platform;

receiving and storing output data from the first software tool;

initiating execution of a second configuration management software tool; and providing as input to the second configuration management software tool, the output data received from the first software tool.

19. The system of claim 18, wherein receiving the data identifying the computing infrastructure characteristics comprises:

receiving a software file associated with the at least provisioning software tool or configuration management software tool, the software file containing instructions for provisioning or configuring a previously-generated computing infrastructure instance; and extracting the computing infrastructure characteristics from the software file.

\* \* \* \* \*

UNITED STATES PATENT AND TRADEMARK OFFICE
CERTIFICATE OF CORRECTION

PATENT NO. : 9,667,489 B2
APPLICATION NO. : 14/724405
DATED : May 30, 2017
INVENTOR(S) : Steven Morris et al.

Page 1 of 1

It is certified that error appears in the above-identified patent and that said Letters Patent is hereby corrected as shown below:

In the Claims

Column 23, Line 12, Claim 7, please remove "," and replace with --;--

Signed and Sealed this
Ninth Day of January, 2018

Joseph Matal
*Performing the Functions and Duties of the*
*Under Secretary of Commerce for Intellectual Property and*
*Director of the United States Patent and Trademark Office*